United States Patent [19]
Dahl

[11] Patent Number: 5,798,759
[45] Date of Patent: Aug. 25, 1998

[54] METHOD AND APPARATUS FOR MOBILE DEVICE SCREEN REFORMATTING

[75] Inventor: Scott S. Dahl, Rochester, Minn.

[73] Assignee: International Business Machines Corporation, Armonk, N.Y.

[21] Appl. No.: 775,652

[22] Filed: Dec. 31, 1996

[51] Int. Cl.$^6$ ........................................................ G06F 3/00
[52] U.S. Cl. .............................. 345/339; 345/2; 345/3; 345/334; 345/329
[58] Field of Search .............................. 345/326-358, 345/1, 2, 3, 173-183; 364/188-189; 348/12, 13, 552, 211-214

[56] References Cited

U.S. PATENT DOCUMENTS

| | | | |
|---|---|---|---|
| 4,763,356 | 8/1988 | Day, Jr. et al. | 345/352 X |
| 5,086,385 | 2/1992 | Launey et al. | 364/188 |
| 5,357,316 | 10/1994 | Ikezaki | 345/327 |
| 5,396,546 | 3/1995 | Remillard | 348/13 X |
| 5,598,523 | 1/1997 | Fujita | 345/352 |
| 5,627,977 | 5/1997 | Hickey et al. | 345/329 |

*Primary Examiner*—John E. Breene
*Attorney, Agent, or Firm*—Andrew J. Dillon

[57] ABSTRACT

The present invention is directed to an improved mobile data processing device and a method of operating a mobile data processing device. The mobile data processing device includes a relatively small display screen. The present invention facilities utilization by the mobile data processing device of an application which includes a plurality of screens which have been written for use in a data processing system having a relatively large display screen. When the application is loaded into the mobile data processing device and started, at least a portion of a particular one of the plurality of screens of the application is displayed on the relatively small display screen of the mobile data processing device. Preferably, but not necessarily, the operator is prompted to enter a training mode of operation. During the training mode of operation, the mobile data processing device is utilized to monitor and record the operator selections of items from the particular one of the plurality of screens of the application. The mobile data processing device is utilized to generate and record a display table of the operator selections of items from the particular one of the plurality of screens of the application. Thereafter, the mobile data processing device utilizes the display table to automatically generate a substitute screen for the particular one of the plurality of screens of the application. The substitute screen relocates the operator selection of items to render them visible on the relatively small display screen of the mobile data processing device. Preferably, this process is repeated for each particular screen which is called for display by the mobile data processing device. Preferably, the mobile data processing device generates a record (or catalog) of the particular ones of the plurality of screens of the application for which a substitute screen exists. Thereafter, anytime any particular screen for which a substitute screen exists is called for display by the mobile data processing device, the substitute screen is generated and displayed in the relatively small display of the mobile data processing device. In this manner, the screen elements which are more important, more or more frequently used by the operator may be displayed in their entirety within the relatively small display device.

16 Claims, 6 Drawing Sheets

METHOD AND APPARATUS FOR MOBILE DEVICE SCREEN REFORMATTING

BACKGROUND OF THE INVENTION

1. Field of the Invention

The present invention relates in general to mobile computing devices, and in particular to "palmtop" for mobile computing devices.

2. Description of the Prior Art

Most desktop and laptop data processing systems include relatively large displays. Consequently, most software applications are typically written for a 24 by 80 character screen. However, the recent emergence of handheld mobile data processing devices has resulted in a far smaller display area. These handheld mobile data processing devices attempt to minimize the weight of the device, to maximize power conservation in operation of the device, and to reduce the size of the mobile data processing device display screen in order to allow the device to fit in the palm of a person's hand. Unfortunately, this compromise leads to a great reduction in the display space available for use by the software programs.

As new handheld mobile data processing or computing devices are developed, there is a considerable lag in time until the software applications have been modified by the software developers from a 24 by 80 character screen to a smaller screen, such as a 16 by 16 character display. Unfortunately, this leads to the requirement of dual support for both the full-sized display and a reduced-sized display.

SUMMARY OF THE INVENTION

It is one objective of the present invention to provide an improved mobile data processing device and method of operating a mobile data processing device which allows the operator of the mobile data processing device to generate substitute screens for particular ones of a plurality of screens associated with an application which allows the operator to determine the content of the substitute screen and the order of appearance of items on the substitute screen. The method and apparatus of the present invention is particularly useful in applications which include a plurality of field elements which have been arranged and ordered for appearance in a data processing system having a relatively large display screen. The present invention is advantageous over the prior art in that it does not require the use of special utility programs or trained developers to capture screen data and rearrange the screens to fit a particular mobile display device. Additionally, this solution is flexible and allows the end user to arrange the screen information to his/her preference. Finally, the present invention is advantageous over the prior art in that it is adaptable to any sized display screen, and is thus a solution which is not machine-dependent.

These and other objectives are achieved as is now described. The present invention is directed to an improved mobile data processing device and a method of operating a mobile data processing device. The mobile data processing device includes a relatively small display screen. The present invention facilities utilization by the mobile data processing device of an application which includes a plurality of screens which have been written for use in a data processing system having a relatively large display screen. When the application is loaded into the mobile data processing device and started, at least a portion of a particular one of the plurality of screens of the application is displayed on the relatively small display screen of the mobile data processing device. Preferably, but not necessarily, the operator is prompted to enter a training mode of operation. During the training mode of operation, the mobile data processing device is utilized to monitor and record the operator selections of items from the particular one of the plurality of screens of the application. The mobile data processing device is utilized to generate and record a display table of the operator selections of items from the particular one of the plurality of screens of the application. Thereafter, the mobile data processing device utilizes the display table to automatically generate a substitute screen for the particular one of the plurality of screens of the application. The substitute screen relocates the operator selection of items to render them visible on the relatively small display screen of the mobile data processing device. Preferably, this process is repeated for each particular screen which is called for display by the mobile data processing device. Preferably, the mobile data processing device generates a record (or catalog) of the particular ones of the plurality of screens of the application for which a substitute screen exists. Thereafter, anytime any particular screen for which a substitute screen exists is called for display by the mobile data processing device, the substitute screen is generated and displayed in the relatively small display of the mobile data processing device. In this manner, the screen elements which are more important, more useful, or more frequently used by the operator may be displayed in their entirety within the relatively small display device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
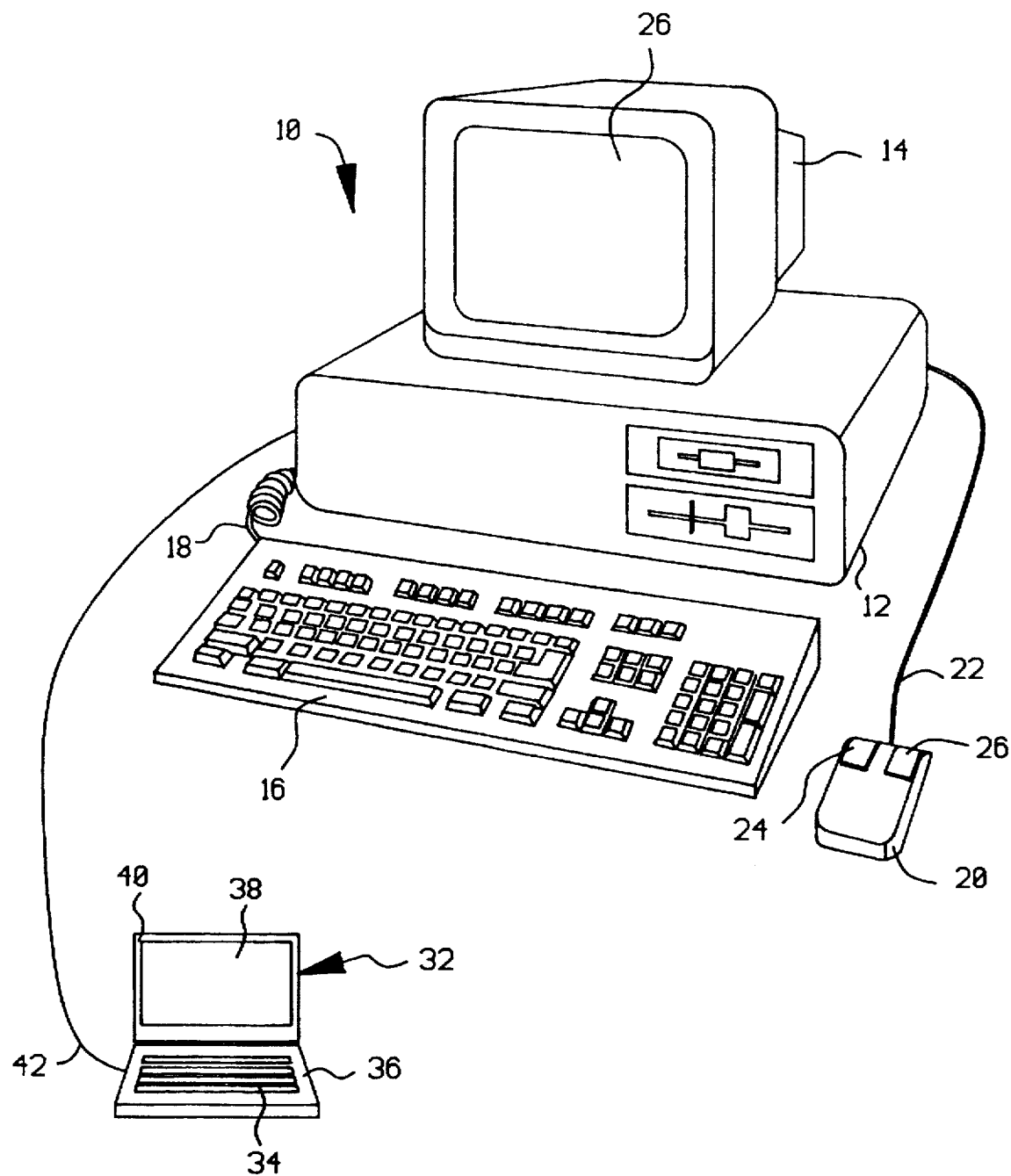
FIG. 1 is a pictorial representation of a desktop data processing system which includes a relatively large display screen, and a mobile data processing device which includes a relatively small display screen.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a so-called personal computer, such as those manufactured by International Business Machines Corporation.

As is clearly shown in FIG. 1, display 14 includes a relatively large video display which is utilized to display the screens and user interfaces for the various applications which are run by data processing system 10. Display 14 typically includes a 24 by 80 character screen format, which is the de facto standard for most applications currently available for data processing system Mobile data processing device 32 is a so-called "palmtop" device which includes a central processing unit, memory, and applications which are executed by the mobile data processing device. Typically, mobile data processing device 32 includes a keypad or keyboard 34 on a lower portion 36 of a housing, and display 38 on an upper portion 40 of a housing. Typically, the two halves of the housing can be folded together to make this device a relatively slimline device which can be carried in a jacket pocket, purse, or briefcase with ease. As is shown in FIG. 1, mobile data processing device 32 includes a relatively small display 38. The mobile data processing devices which are currently available in the marketplace have a variety of sizes of displays. One exemplary size is a 16 by 16 character display. Obviously, the 16 by 16 character display is not adequate in size to accommodate the screens of applications which are suitable for execution by data processing system 10. However, mobile data processing device 32 has sufficient processing power and memory in order to execute such applications. The present invention is directed to a method and apparatus which allows mobile data processing device 32 to execute applications which are written for the relatively large display of data processing system 10 without requiring special utility programs or trained developers to develop software for the smaller device. This solution of the present invention is flexible and allows the end user to arrange the screen information to his/her own personal preference. Furthermore, the method and apparatus of the present invention allows the end user to adapt the application to any particular sized device. Mobile data processing device may be coupled through bus 42 to data processing device 10 to allow for the exchange of programs and data.

Figure 2:
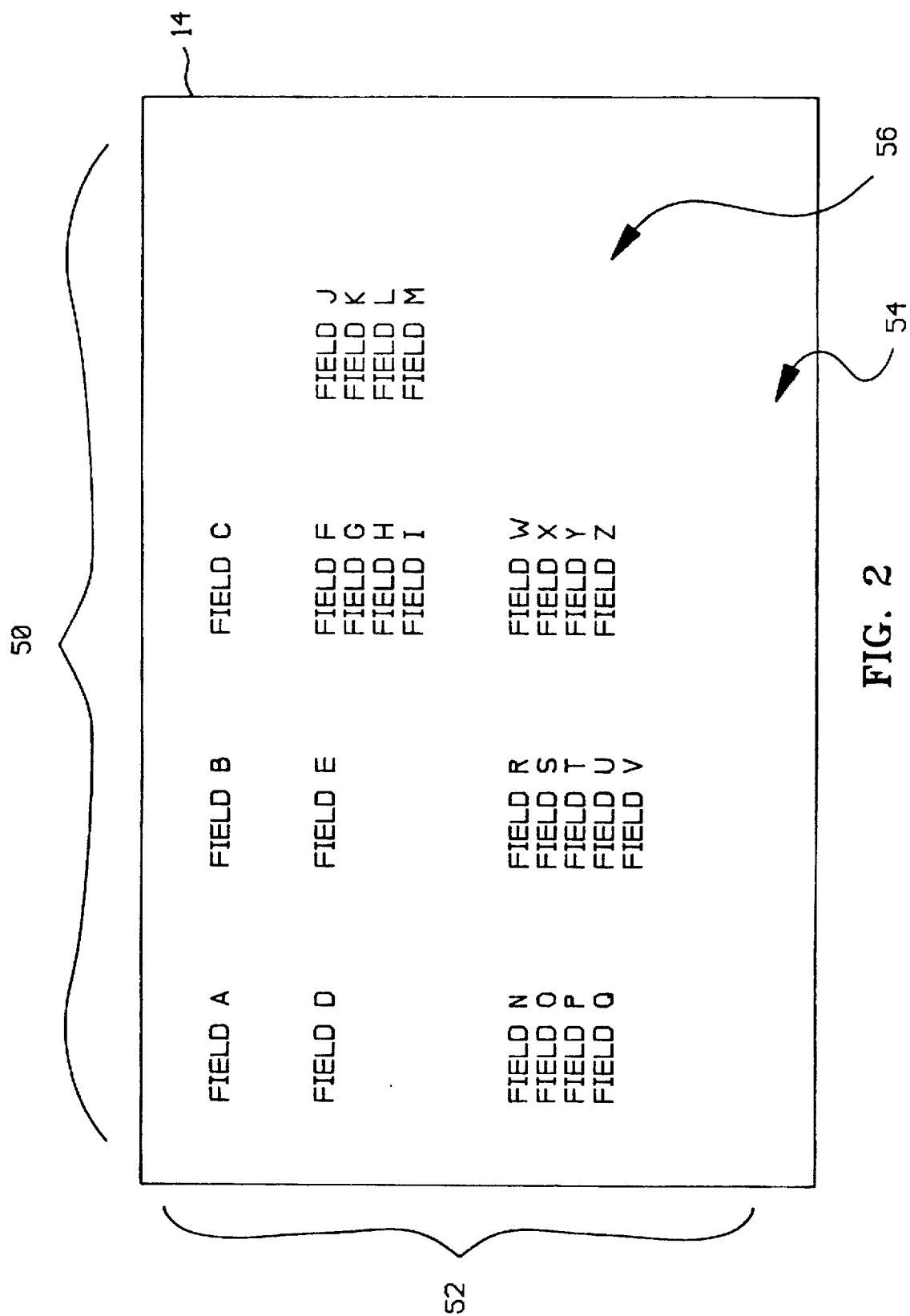
FIG. 2 depicts a particular display screen of an application which may be viewed in its entirety on the relatively large display of the desktop data processing device of FIG. 1.
Figure 3:
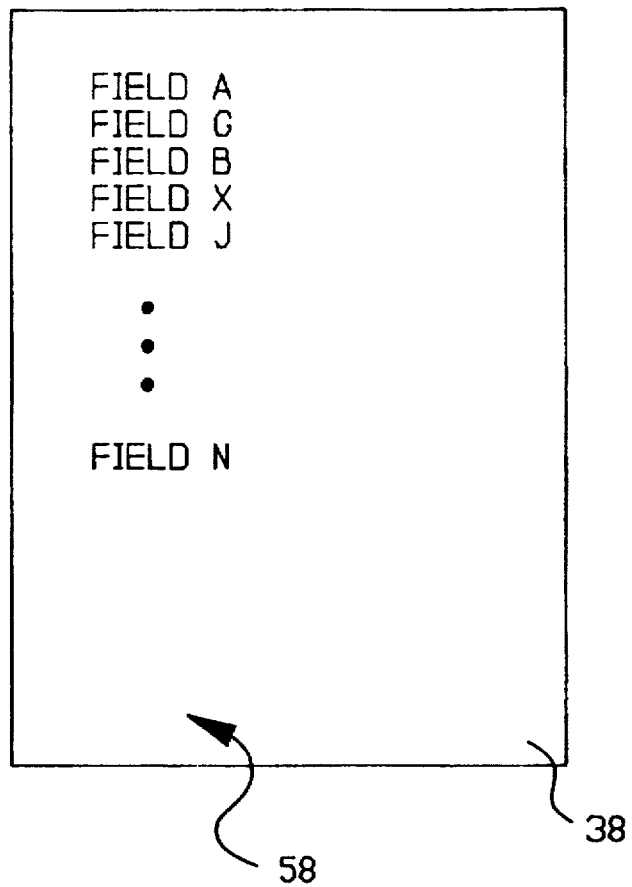
FIG. 3 depicts the relatively small display screen of the mobile data processing device which displays a substitute screen for the screen of FIG. 2.

FIG. 2 is a pictorial representation of a particular one of a plurality of screens of an application which is executable by both data processing system 10 (of FIG. 1) and mobile data processing device 32 (of FIG. 1). As is shown, the width of the screen is approximately 80 characters long, as is conventional. The length of the screen is 24 characters long, also as is conventional. The screen 54, which is depicted within display 14, includes a plurality of screen items 56, which are arranged in particular locations within screen 54. For example, the item identified as "Field A" is located in the upper lefthand portion of screen 54. The items identified as "Field W", "Field X", "Field Y", and "Field Z" are located at the lower righthand portion of screen 54. In accordance with the present invention, the operator is allowed to select particular items from screen 54 which are more important or more frequently used for generation of a substitute screen, such as substitute screen depicted in FIG. 3. As is shown in FIG. 3, operator selections are displayed in the relatively smaller display 38 of mobile data processing device 32. In accordance with the present invention, the operator has control of the content and order of the substitute screen 58 which is displayed in relatively small display 38. As is shown, the operator has selected "Field A", "Field G", "Field B", "Field X", and "Field J" for display, in that particular order. A variety of other additional and different fields may also be selected and positioned in a preferred display order by the operator.

Figure 4A:
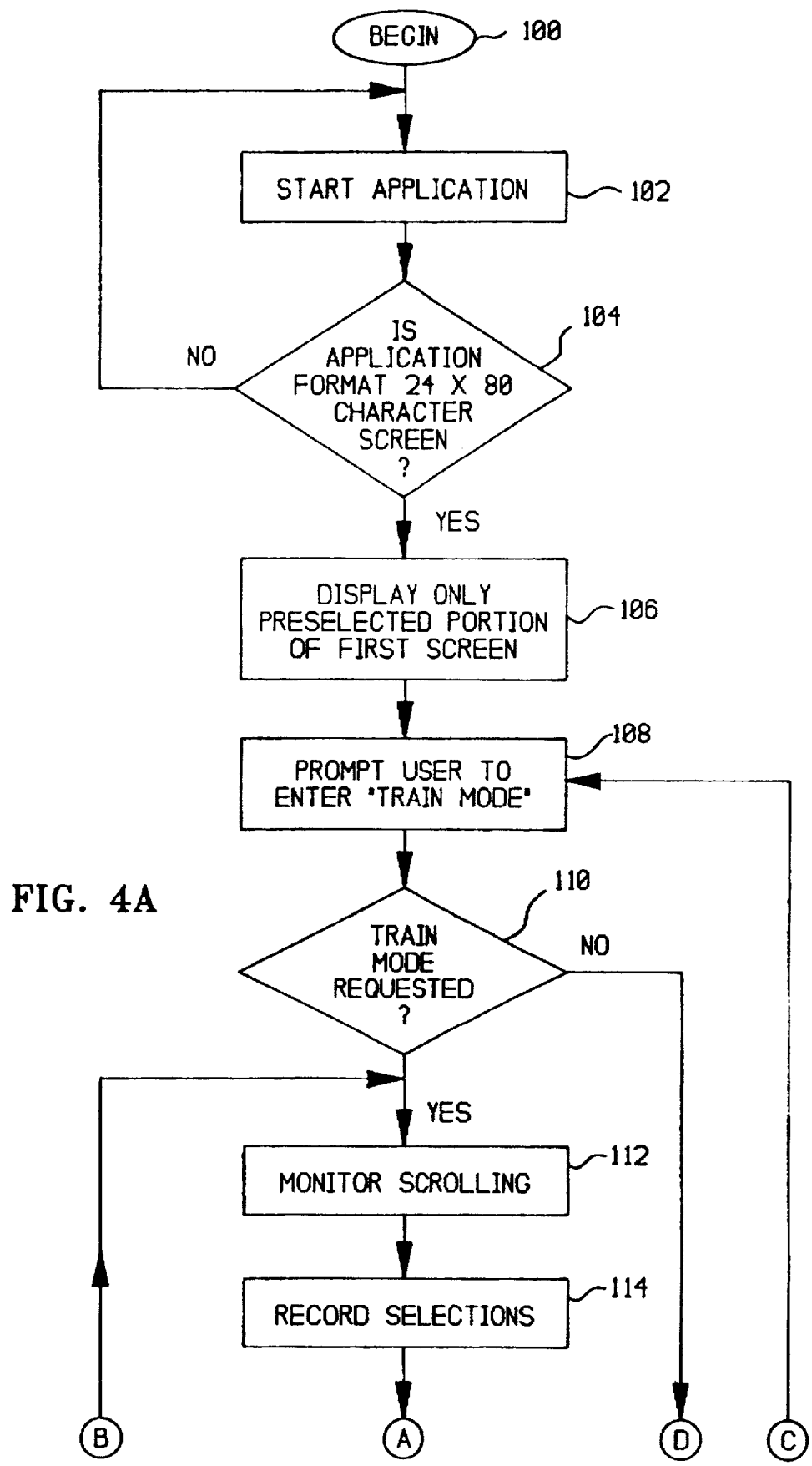
FIGS. 4A–B is a flowchart representation of the computer program implementation of the method and apparatus of the present invention for facilitating the display of application screens on a relatively small screen of a mobile data processing device.
Figure 4B:
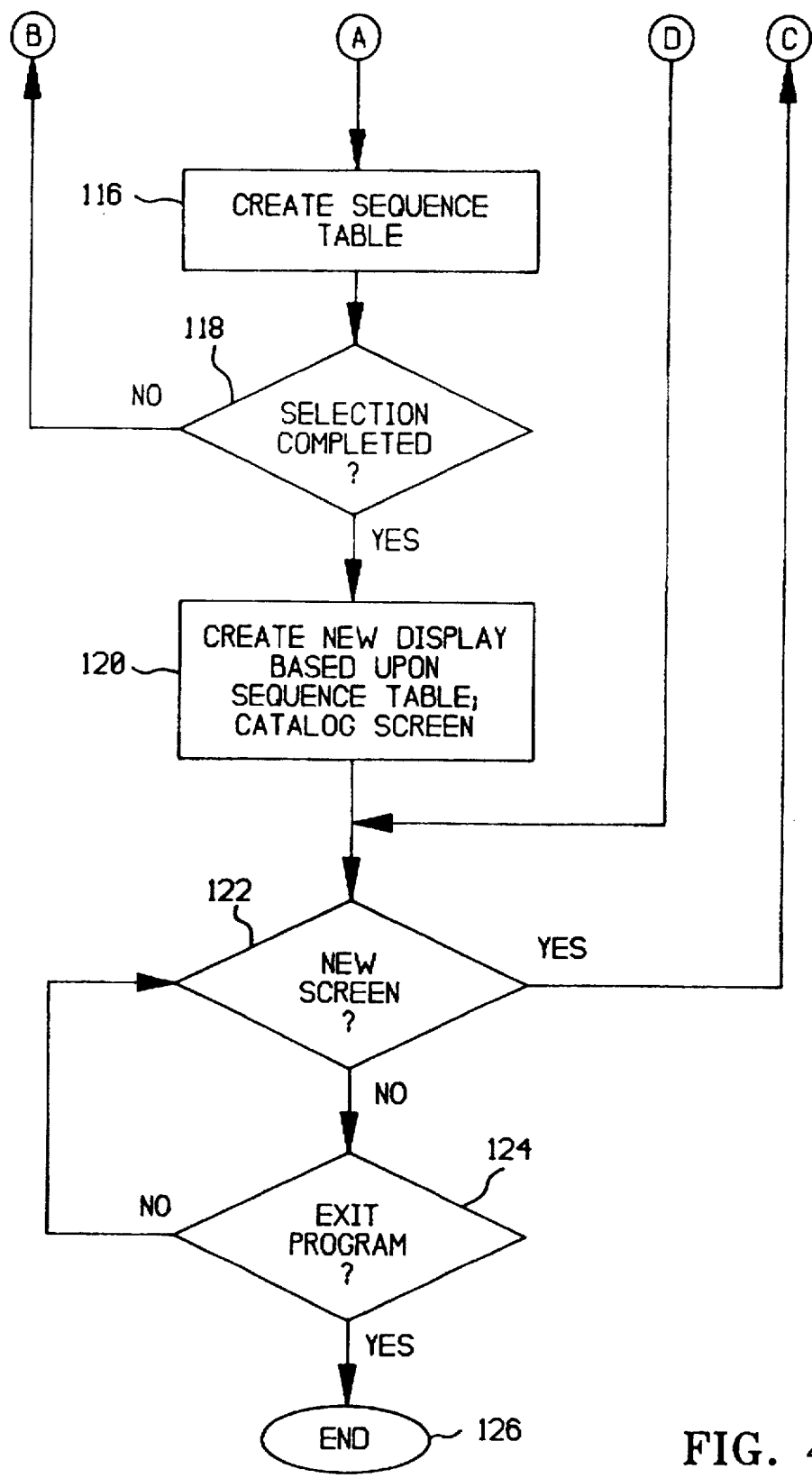

FIGS. 4A-B is a flowchart representation of the computer program implementation of the present invention. The process begins at software block 100 and continues at software block 102, wherein a particular application is started by mobile data processing device 32. In accordance with software block 104, mobile data processing device 32 determines whether the application that has been started is formatted for a 24 by 80 character screen; if not, control returns to software block 102; if so, control passes to software block 106, wherein the relatively small screen of mobile data processing device 32 is utilized to display only a preselected portion of the first screen which is called for display. In accordance with software block 108, if the particular screen is formatted for the 24 by 80 character screen, mobile data processing device 32 prompts the user to enter a training mode of operation. If the operator declines to enter the training mode of operation, control passes to software block 122 (which will be described below). However, if the training mode is selected by the operator, control passes to software block 112, wherein mobile data processing device 32 is utilized to monitor the operator-controlled scrolling of the particular screen which is currently displayed in the relatively small display 38 of mobile data processing device 32. Preferably, a predetermined user input is defined for operator selection of items in the relatively small display 38 of mobile data processing device 32. In accordance with software block 114, mobile data processing device 32 records the operator selection of items from the screen currently displayed in the relatively small screen 38 of mobile data processing device 32. Next, in accordance with software block 116, mobile data processing device 32 creates a sequence table in accordance with the operator's selection.

Figure 5:
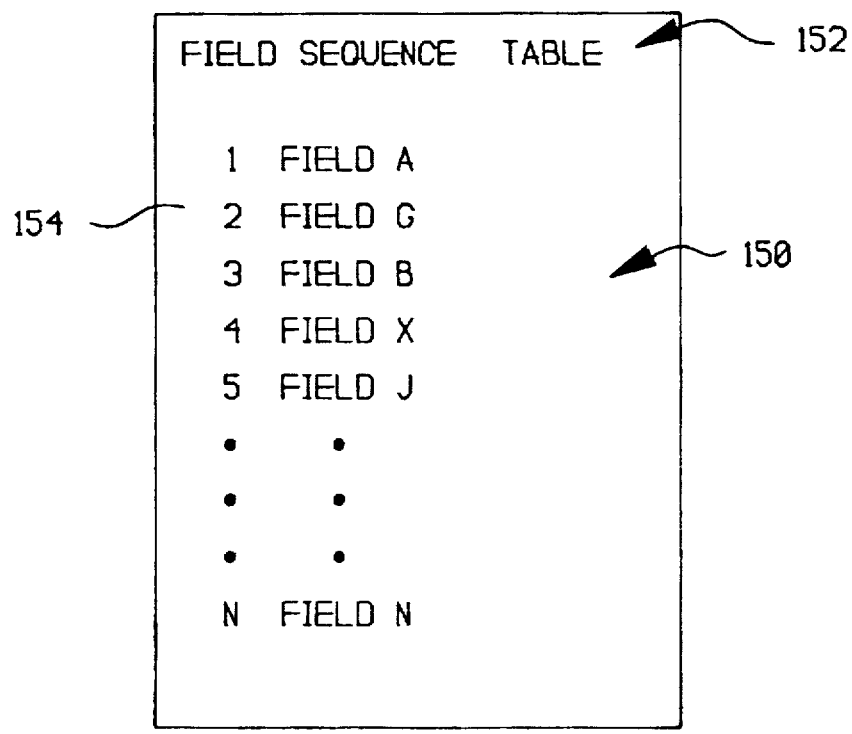
FIG. 5 is a pictorial representation of a file sequence table generated by the software in accordance with the present invention in order to determine the content and order of screen items which are selected by the operator for inclusion in a substitute screen.

FIG. 5 is a pictorial representation of a sequence table 150 which includes a title 152 and a plurality of elements 154 which are numbered and ordered in the order of selection by the operator during the training mode of operation. The sequence table 150 is utilized subsequent to the training mode of operation for generating a substitute screen for the particular screen of the application each time it is called for display by mobile data processing device 32. Returning now to FIG. 4, the process continues at software block 108, wherein mobile data processing device 32 determines whether the user selection during the training mode of operation has been completed. Preferably, there is a particular user input which determines completion of the operation, such as entry of a response in a dedicated field or through predetermined user-controlled interaction between the graphical pointing device and the graphical user interface. Next, in accordance with software block 120, a new display is created which is based upon the sequence table which has been generated for the particular screen during the training mode of operation. As is depicted in software block 122, each time a new screen is called for display by mobile data processing device 32, control returns to software block 108, wherein the user is prompted to enter the training mode of operation and repeat the sequences described above for generation of a sequence table (such as sequence table 150 of FIG. 5) for each particular screen of the application. In this manner, a substitute screen is developed for each screen as it is used by the operator. Subsequently, each time a particular screen is called for display by mobile data processing device 32, the substitute screen is displayed in lieu of the particular screen that would be displayed in a relatively large display of a data processing system.

Figure 6:
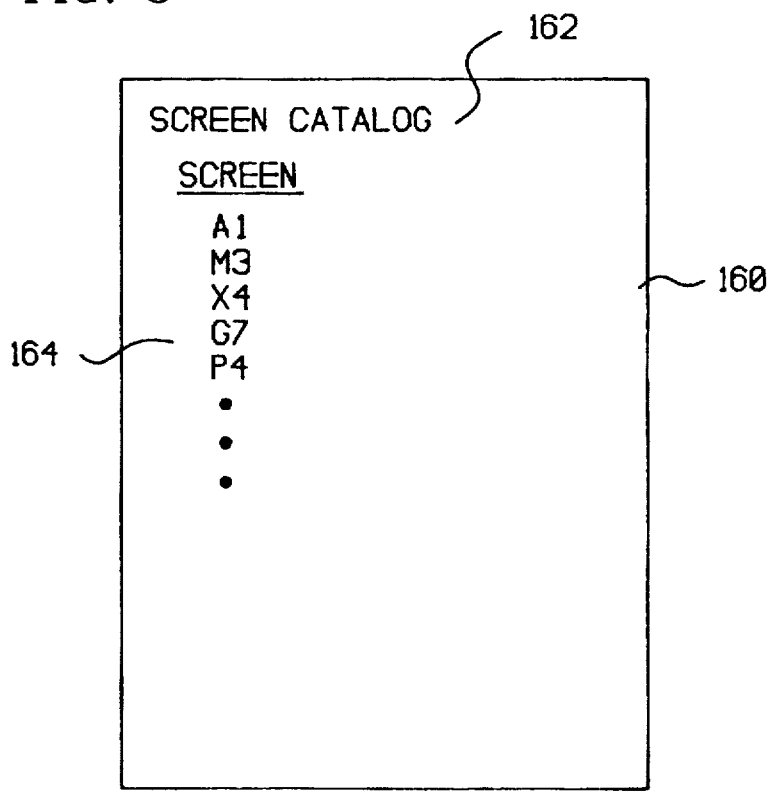
FIG. 6 is a pictorial representation of a screen catalog in accordance with the present invention which develops a record of screens of a particular application which have corresponding substitute screens associated therewith.

FIG. 6 is a graphical depiction of a record which is generated that catalogs the various screens which have been reviewed by the operator, and profiled in a field sequence table. FIG. 6 depicts a screen catalog 160 which includes a title 162 and a plurality of identifiers 164 for the particular screens of the application.

What is claimed is:

1. A method of operating a mobile data processing device with a relatively small display screen to facilitate utilization of an application which includes a plurality of screens which have been written for use in a data processing system having a relatively large display screen, comprising the method steps of:

loading said application into said mobile data processing device;

displaying at least a portion of a particular one of said plurality of screens of said application on said relatively small display screen of said mobile data processing device;

entering a training mode of operation;

during said training mode of operation, monitoring and recording operator selection of items from said particular one of said plurality of screens of said application;

generating and recording a display table of said operator selection of items from said particular one of said plurality of screens of said application; and utilizing said display table thereafter to automatically generate a substitute screen for said particular one of said plurality of screens of said application which relocates said operator selection of items to render them visible on said relatively small display screen of said mobile data processing device.

2. A method of operating a mobile data processing device according to claim 1, further comprising:

automatically determining whether or not said particular one of said plurality of screens has been written for use in a data processing system having a relatively large display screen; and prompting for operator initiation of said training mode of operation.

3. A method of operating a mobile data processing device according to claim 2, further comprising:

allowing operator navigation throughout said particular one of said plurality of screens; and allowing operator selection of said items from said particular one of said plurality of screens of said application.

4. A method of operating a mobile data processing device according to claim 3, wherein said step of allowing operator navigation comprises:

allowing operator scrolling through said particular one of said plurality of screens of said application.

5. A method of operating a mobile data processing device according to claim 1 wherein said items comprise fields.

6. A method of operating a mobile data processing device according to claim 1, wherein said step of utilizing said display table comprises:

utilizing said display table thereafter to generate automatically a substitute screen for said particular one of said screens of said application which relocates said operator selection of items to render them visible in the order of said operator selection on said relatively small display screen of said mobile data processing device.

7. A method of operating a mobile data processing device according to claim 1, further comprising:

displaying others of said plurality of screens of said application:

for each of said others of said plurality of screens of said application:

(a) entering a training mode of operation;

(b) monitoring and recording operator selections of items;

(c) generating and recording a display table of said operator selection of items; and (d) utilizing said display table thereafter to generate automatically a substitute screen which relocates said operator selection of items for display on said relatively small display screen of said mobile data processing device.

8. A method of operating a mobile data processing device according to claim 7, further comprising:

developing a record of which particular ones of said plurality of screens of said application have corresponding substitute screens;

utilizing said record to display said substitute screens when they are called for display by said mobile data processing device.

9. A method of operating a mobile data processing device according to claim 1, wherein said step of displaying comprises:

displaying only a portion of said particular one of said plurality of screens of said application on said relatively small display screen of said mobile data processing device.

10. An improved mobile data processing device with a relatively small display screen which is adapted to utilize an application which includes a plurality of screens which have been written for use in a data processing system having a relatively large display screen, comprising:

means for determining if a particular one of said plurality of screens of said application which is called for display has been written for use in a data processing system having a relatively large display screen;

means for displaying at least a portion of said particular one of said plurality of screens of said application on said relatively small display screen of said mobile data processing device;

means for entering a training mode of operation;

means for monitoring and recording operator selection of items from said particular one of said plurality of screens of said application;

means for generating and recording a display table of said operator selection of items from said particular one of said plurality of screens of said application; and means for thereafter using said display table to generate automatically a substitute screen for said particular one of said screens of said application which relocates said operator selection of items to render them visible on said relatively small display screen of said mobile data processing device.

11. An improved mobile data processing device according to claim 10, further comprising:

means for prompting operator initiation of said training mode of operation.

12. An improved mobile data processing device according to claim 11, further comprising:

means for allowing operator navigation through said particular one of said plurality of screen; and means for allowing operator selection of said items from said particular one of said plurality of screens of said application.

13. An improved mobile data processing device according to claim 10, wherein said items comprise fields.

14. An improved mobile data processing device according to claim 10, wherein said means for thereafter utilizing said display table comprises:

means for thereafter utilizing said display table to generate automatically a substitute screen for said particular one of said screens of said application which relocates said operator selection of items to render them visible in the order of said operator selection on said relatively small display screen of said mobile data processing device.

15. An improved mobile data processing device according to claim 10, further comprising:

means for sequentially processing others of said plurality of screens of said application in order to develop a substitute screen for each of said others of said plurality of screens of said application.

16. An improved mobile data processing device according to claim 15, further comprising:

means for developing a record of which particular ones of said plurality of screens of said application have corresponding substitute screens; and means for utilizing said record to display said substitute screens when they are called for display by said mobile data processing device.

* * * * *

UNITED STATES PATENT AND TRADEMARK OFFICE
CERTIFICATE OF CORRECTION

PATENT NO. : 5,798,759

DATED : August 25, 1998

INVENTOR(S) : Scott S. Dahl

It is certified that error appears in the above-identified patent and that said Letters Patent is hereby corrected as shown below:

Title page, item [57],
IN THE ABSTRACT

Col. 2, Line 33, "more or more" should be --more useful, or more--.

Signed and Sealed this

Fifteenth Day of December, 1998

Attest:

BRUCE LEHMAN

*Attesting Officer*    *Commissioner of Patents and Trademarks*